April 26, 1938.  W. H. PRESTON  2,115,234
ENSILAGE CUTTING MACHINE
Filed July 15, 1936   2 Sheets-Sheet 1
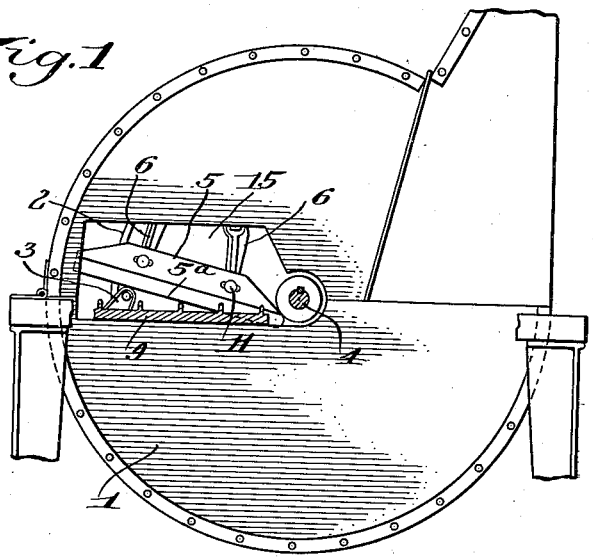
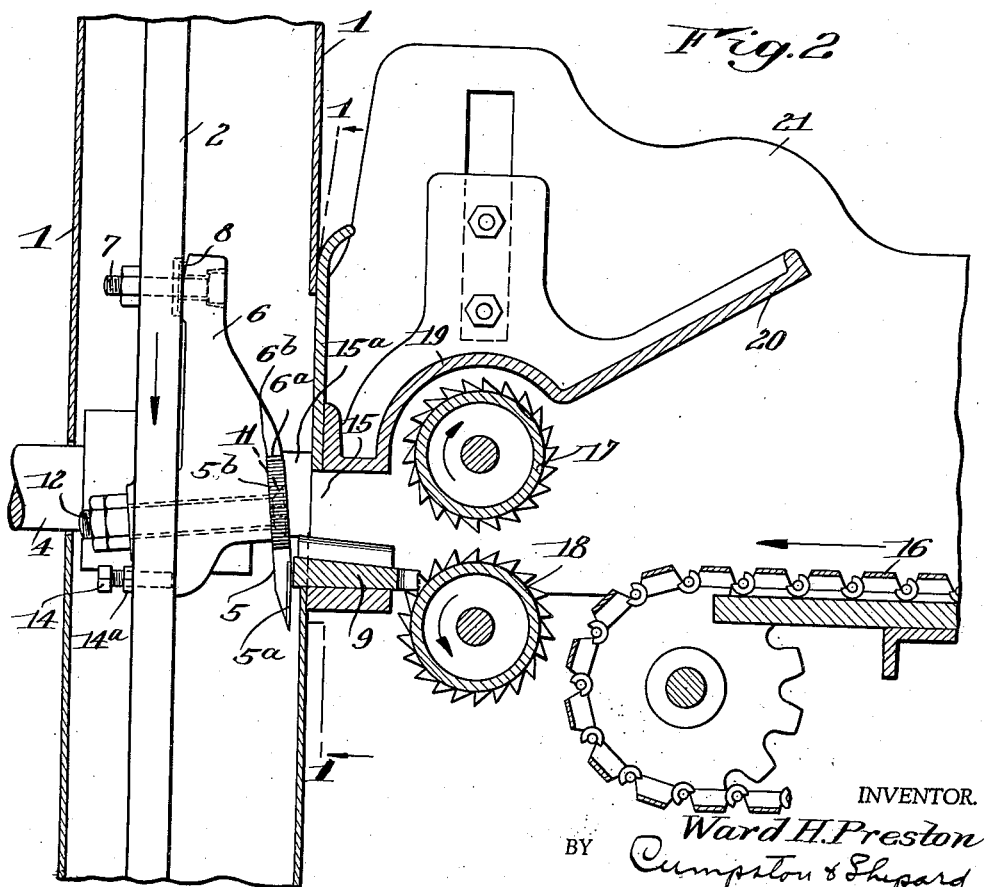
INVENTOR.
Ward H. Preston
BY Cumpston & Shepard
his ATTORNEYS

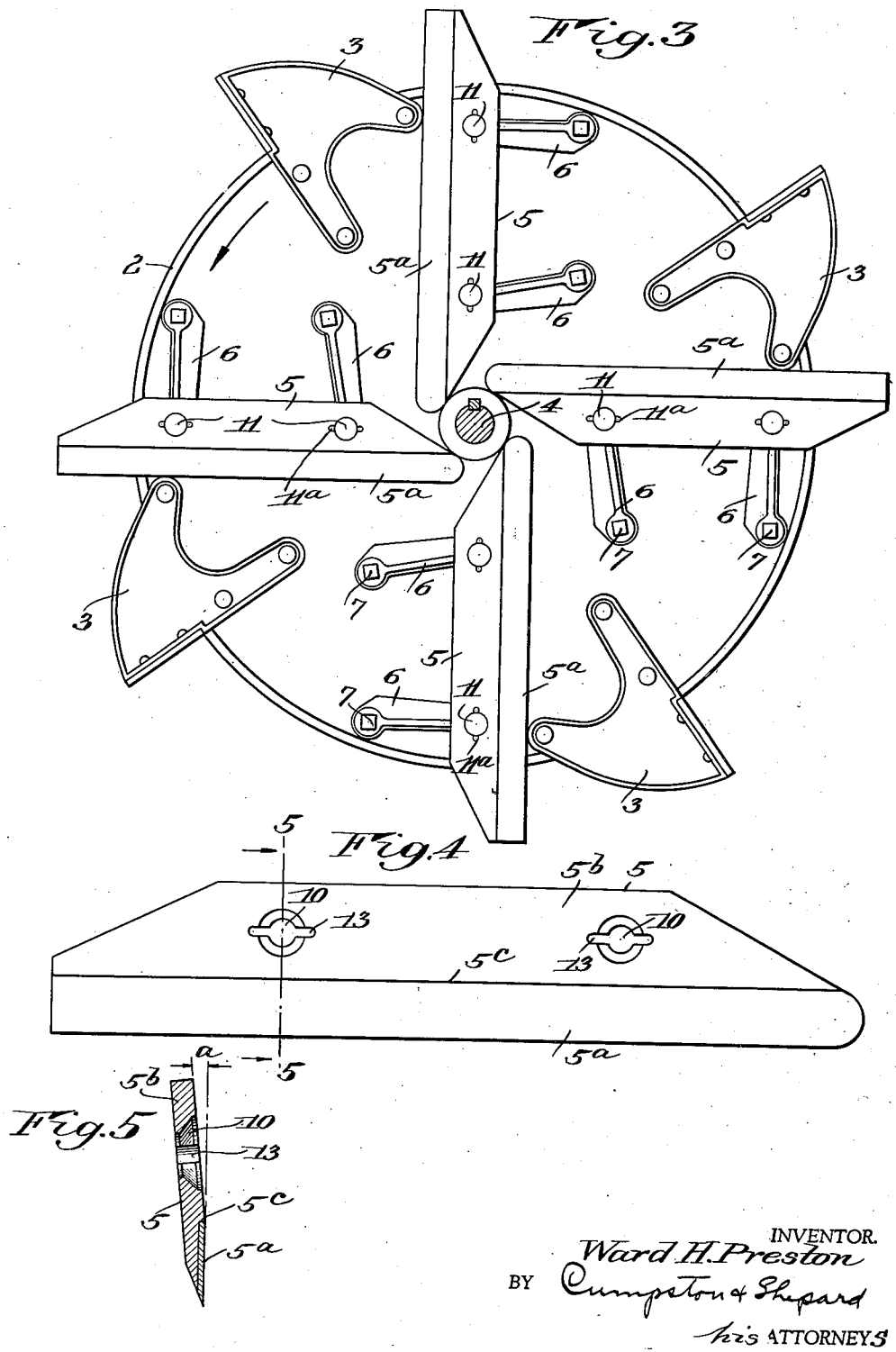

Patented Apr. 26, 1938

2,115,234

UNITED STATES PATENT OFFICE 2,115,234

ENSILAGE CUTTING MACHINE

Ward H. Preston, Shortsville, N. Y., assignor to Papec Machine Company, Shortsville, N. Y., a corporation of New York Application July 15, 1936, Serial No. 90,749

3 Claims. (Cl. 146—109)

The present invention relates to machines for cutting fodder and other forage such, for example, as corn and has for its object to provide an improved arrangement of parts which will cooperate to efficiently and uniformly cut the material to the desired lengths and which will facilitate the continuous passage of the material through the machine.

A further object of the invention is to provide an improved shearing knife for an ensilage cutting machine, constructed for cooperation with the shear plate in a manner to avoid breaking or severing of the material or stock in excessive or uneven lengths, and which will afford clearance for the passage of the material in order to avoid the disadvantages of allowing the feed mechanisms to become choked with the material.

A further object of the invention is to provide an improved knife for an ensilage cutting machine, having a shearing portion the inner face of which is adapted for operation in a plane substantially perpendicular to the shear plate or the axis of rotation, said knife including a supporting back portion inclined away from the inner face of the cutting or shearing portion and in the direction of the feed of the material whereby to afford clearance for the passage of the material during the shearing operations.

To these and other ends the invention resides in certain improvements and combinations of parts, all as will be hereinafter more fully described, the novel features being pointed out in the claims at the end of the specification.

In the drawings:

Fig. 1 is a transverse sectional elevation substantially on line 1—1 of Fig. 2;

Fig. 2 is a longitudinal sectional elevation through the machine shown in Fig. 1, drawn to an enlarged scale;

Fig. 3 is an end elevation of the cutting wheel showing the application of the knives and fan blades thereto;

Fig. 4 is a side view of one of the improved knives shown in Fig. 3, and

Fig. 5 is a transverse section through the knife taken on line 5—5 of Fig. 4.

The same reference numerals throughout the several views indicate the same parts.

The present invention relates to improvements in rotary cutters for ensilage cutting machines of the type in which the cutting knives and fan blades are mounted on a wheel within a pneumatic blower casing and in which the knives are adapted to shear against the edge of a cutter bar or plate disposed at one side of the casing.

The improvements relate more particularly to the manner of constructing and mounting the knives relative to the shear plate, whereby to afford clearance for the passage of the material and to insure greater efficiency in the feeding and severing operations.

If the cut material is not permitted to discharge as fast as it is severed it will accumulate and tend to choke the feed mechanism, thus interfering with the advancement of the material. In such cases the feed rolls will tend to churn or agitate the accumulated cuttings, with the result that the juice will be forced out, the cuttings then being reduced to a pomace-like material, the accumulation of which on the shear plate and between the feed rolls will interfere with the proper feeding of the material. Furthermore, the turning of the feed rolls in the accumulated material will cause them to become smooth and polished so that they will be ineffective as a means for advancing the material. These disadvantages are avoided by the improvements shown and described herein, as will appear hereinafter.

Furthermore, it has been found that with the knives heretofore used in ensilage cutting machines, and especially where the entire knife has been obliquely inclined relatively to the shear plate, that the cut portions of the material will not be of uniform length but will vary in length from time to time.

Moreover, the operation of a knife of the present type with the inner face of the cutting portion in a plane substantially perpendicular to the shear plate and to the axis of rotation avoids cutting or breaking of the stock in excessive lengths, and results in cuttings of uniform length as intended. Furthermore, by inclining the outer or back portion of the knife relative to the shear plate and to the inner face of the shearing blade a continuous feed of the material through the machine will result, thus avoiding choking or clogging of the material between the feed rolls, as will occur when the knife or back portion thereof is operated in a plane perpendicular to the shear plate.

In carrying out my invention I provide a blower casing 1 having therein a cutting wheel 2 provided with the usual fan blades 3 for discharging the cut material from the casing. The cutting wheel is rotatably supported within the casing by an operating shaft 4 journaled in suitable bearings, not shown.

The knives, designated generally by the reference numeral 5, are each mounted on a pair of similarly constructed adjustable supports or brackets 6 disposed on and connected with the wheel at one side thereof. Each bracket is connected to the wheel at one end by means of a clamping bolt 7, said end having a rounded or curved boss-like portion 8 thereon to permit it to become properly seated upon the wheel in the different positions to which the bracket may be adjusted to position the knife in proper relation to the cutter bar or shear plate 9. The brackets are recessed at 6b to receive the supporting back portion 5b of the knife which is provided with countersunk openings 10 for receiving the heads 11 of the bolts 12 for clamping the inner ends of the brackets upon the wheel 2, as shown in Fig. 2. The openings 10 are provided with communicating slots 13 for receiving the oppositely disposed lugs or keys 11a on the bolt heads which serve to prevent turning of the bolts when screwing up the nuts on the threaded ends thereof.

The knife can be adjusted relative to the cutting edge of the shearing plate either forwardly or rearwardly by loosening the bolts 7 and 12 and turning the set screws 14 in the desired direction, at which time the bracket 6 will be rocked upon the rounded portion 8 thereof. The set screws can be secured in the desired position of adjustment by means of a lock nut 14a shown in Fig. 2.

The supporting back or body of the knife is recessed to receive the shearing blade 5a, which is preferably formed of a strip of tool steel, while the main or body portion of the knife may be formed of a relatively soft steel or other suitable material. The outer or back edge of the blade 5a is placed in abutting relation with respect to the shoulder 5c of the body member and the blade may be secured upon the body member by welding or otherwise as desired.

It will be seen from Figs. 2 and 5 that the greater portion of the body of the knife is obliquely inclined relatively to the inner face of the blade 5a, the angle a being such as to afford the desired relief or clearance for the free passage of the cuttings when the knife is opposite the feed opening 15 in the wall of the casing 1, or in other words, in position to shear the material being fed through said opening.

The means for feeding the material to the knives of the cutting wheel preferably comprises a continuous conveyor 16 suitably supported and operated by any preferred means, not shown. The material is delivered by the conveyor to a pair of upper and lower feed rolls 17 and 18 disposed adjacent the shear plate 9, over which the uncut material is fed through the opening 15 to the revolving knives. The opposite ends of the feed rolls are journaled in suitable bearings, not shown, and, if preferred, the upper roll may be made vertically adjustable to vary the distance between the feed rolls.

A cover plate 19 is provided for protecting the feed rolls, said plate having an upwardly and rearwardly inclined portion 20 for guiding the material to the feed rolls, the cover plate being mounted for vertical adjustment between side walls 21 for enclosing the conveyor, only one of which is shown.

The knives are made substantially flush with the inner face portions 6b of the knife supporting brackets which portions are inclined relative to the rear wall of the casing 1, as shown in Fig. 2, whereby to afford greater clearance for the passage of the cut material into the casing for discharge by the fan blades 3. It will be noted that the face portions 6b of the brackets have substantially the same inclination relative to the shear plate as the forwardly inclined portions of the knives whereby to avoid interfering with the free passage of the cut portions of the material in an outward direction within the fan casing 1.

The clearance afforded at 15a between the forwardly inclined portion 5b of the knife and the rear wall of the casing 1 is sufficient to permit of a free and easy discharge of the cut material past the knives when they are in shearing position. In other words, ample clearance is provided under all conditions of operation for the advancement of the cuttings into the fan casing so that continuous discharge of the material to the casing is assured. This, of course, is made possible by inclining the greater portion of the knife relative to and forwardly of the shear plate while maintaining the advantage of having the inner faces of the cutting blades 5a in a plane substantially perpendicular to the axis of rotation of the knives and to the line of feed of the material advanced to the knives by the conveyor and the feed rolls.

It will be noted that the outer face of the cutting portion of the knife blade is beveled adjacent the cutting edge for grinding, to sharpen the knife from time to time, and that since the outer face of the supporting back portion of the knife is inclined forwardly and relative to the inner face of the blade the cutting portion of the knife is tapered and reduced in thickness, whereby to facilitate grinding of the knife.

I claim:

1. In an ensilage machine, feeding means for the material, a shear plate, and a rotary shearing knife for cooperation with the shear plate, said knife comprising a supporting back and a shearing blade mounted thereon having an inner face for operation substantially in a plane perpendicular to the axis of rotation and formed with a straight cutting edge, said supporting back having its inner exposed face inclined obliquely back substantially continuously throughout its extent, relative to the inner face of the blade and in the direction of feed of the material to be cut, whereby to afford clearance for said material to facilitate substantially continuous feeding of the same during the cutting operations.

2. In an ensilage machine, feeding means for the material, a shear plate, and a rotary shearing knife for cooperation with the shear plate, said knife comprising a supporting back and a shearing blade mounted thereon having an inner face for operation in a plane substantially perpendicular to the axis of rotation and formed with a straight cutting edge, said supporting back having its exposed inner face and its opposite outer face each inclined obliquely back, substantially throughout its extent, relative to the inner face of the blade and in the direction of feed of the material to be cut, whereby to afford clearance for said material to facilitate substantially continuous feeding of the same during the cutting operations, and also to reduce the thickness of the portion of the supporting back adjacent the blade to facilitate sharpening of the cutting edge of the knife.

3. In an ensilage machine, feeding means for the material, a shear plate, and a rotary shearing knife for cooperation with the shear plate, said knife comprising a supporting back and a shearing blade thereon having an inner face for operation substantially in a plane perpendicular to the axis of rotation and formed with a straight cutting edge, said supporting back having a face substantially parallel with and supporting said blade and having two other faces inclined obliquely back relative to said blade supporting face in the direction of feed of the material to be cut, whereby to afford clearance for said material to facilitate substantially continuous feeding of the same during the cutting operations, and also to reduce the thickness of the portion of the knife to be ground in sharpening the cutting edge.

WARD H. PRESTON.